United States Patent
Taherzadeh Boroujeni et al.

(10) Patent No.: US 11,950,297 B2
(45) Date of Patent: Apr. 2, 2024

(54) REPETITION-BASED CONTENTION-FREE RANDOM ACCESS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/444,652

(22) Filed: Aug. 6, 2021

(65) Prior Publication Data
US 2023/0037319 A1    Feb. 9, 2023

(51) Int. Cl.
*H04W 74/08* (2009.01)
*H04W 72/0446* (2023.01)
*H04W 74/00* (2009.01)
*H04W 74/02* (2009.01)
*H04W 74/0833* (2024.01)

(52) U.S. Cl.
CPC ... *H04W 74/0841* (2013.01); *H04W 72/0446* (2013.01); *H04W 74/006* (2013.01); *H04W 74/02* (2013.01)

(58) Field of Classification Search
CPC ......... H04W 74/0841; H04W 72/0446; H04W 74/006; H04W 74/02; H04W 74/0833
See application file for complete search history.

(56) References Cited

U.S. PATENT DOCUMENTS

| 2020/0053786 | A1  |  2/2020 | Kim et al. |
| 2021/0037573 | A1  |  2/2021 | Ly et al. |
| 2022/0385381 | A1* | 12/2022 | MolavianJazi ........... H04L 1/08 |
| 2023/0189255 | A1* |  6/2023 | Bagheri ................ H04L 1/1812 |
| | | | 370/329 |

FOREIGN PATENT DOCUMENTS

| WO | 2020032750 A1    |  2/2020 |
| WO | WO-2022235962 A1 * | 11/2022 |

OTHER PUBLICATIONS

International Search Report and Written Opinion—PCT/US2022/072951—ISA/EPO—dated Sep. 23, 2022.

* cited by examiner

*Primary Examiner* — Chae S Lee
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information indicating at least one of: a configuration for requesting repetition for an uplink shared channel transmitted after receiving a contention-free random access (CFRA) message, or a configuration for dropping one or more repetitions of the uplink shared channel. The UE may request the repetition for the uplink shared channel if the configuration information indicates the configuration for requesting repetition. The UE may transmit the uplink shared channel based at least in part on the configuration information. Numerous other aspects are described.

30 Claims, 7 Drawing Sheets

REPETITION-BASED CONTENTION-FREE RANDOM ACCESS

FIELD OF THE DISCLOSURE

Aspects of the present disclosure generally relate to wireless communication and to techniques and apparatuses for repetition-based contention-free random access (CFRA).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving configuration information indicating at least one of, a configuration for requesting repetition for an uplink shared channel transmitted after receiving a CFRA message, or a configuration for dropping one or more repetitions of the uplink shared channel. The method may include requesting the repetition for the uplink shared channel if the configuration information indicates the configuration for requesting repetition. The method may include transmitting the uplink shared channel based at least in part on the configuration information.

Some aspects described herein relate to a method of wireless communication performed by a base station. The method may include transmitting, to a UE, configuration information indicating at least one of, a configuration for requesting repetition for an uplink shared channel transmitted after receiving a CFRA message, or a configuration for dropping one or more repetitions of the uplink shared channel. The method may include receiving a request for repetition for the uplink shared channel if the configuration information indicates the configuration for requesting repetition. The method may include receiving the uplink shared channel based at least in part on the configuration information.

Some aspects described herein relate to an apparatus for wireless communication at a UE. The apparatus may include a memory. The apparatus may include one or more processors, coupled to the memory, configured, receive configuration information indicating at least one of: a configuration for requesting repetition for an uplink shared channel transmitted after receiving a CFRA message, or a configuration for dropping one or more repetitions of the uplink shared channel request the repetition for the uplink shared channel if the configuration information indicates the configuration for requesting repetition transmit the uplink shared channel based at least in part on the configuration information.

Some aspects described herein relate to an apparatus for wireless communication at a base station. The apparatus may include a memory. The apparatus may include one or more processors, coupled to the memory, configured, transmit, to a UE, configuration information indicating at least one of: a configuration for requesting repetition for an uplink shared channel transmitted after receiving a CFRA message, or a configuration for dropping one or more repetitions of the uplink shared channel receive a request for repetition for the uplink shared channel if the configuration information indicates the configuration for requesting repetition receive the uplink shared channel based at least in part on the configuration information.

Some aspects described herein relate to a non-transitory computer-readable medium that stores a set of instructions for wireless communication by a UE. The set of instructions, when executed by one or more processors of the UE, may cause the UE to receive configuration information indicating at least one of. The set of instructions, when executed by one or more processors of the UE, may cause the UE to request the repetition for the uplink shared channel if the configuration information indicates the configuration for requesting repetition. The set of instructions, when executed by one or more processors of the UE, may cause the UE to transmit the uplink shared channel based at least in part on the configuration information.

Some aspects described herein relate to a non-transitory computer-readable medium that stores a set of instructions for wireless communication by a base station. The set of instructions, when executed by one or more processors of the base station, may cause the base station to transmit, to a UE, configuration information indicating at least one of. The set of instructions, when executed by one or more processors of the base station, may cause the base station to receive a request for repetition for the uplink shared channel if the configuration information indicates the configuration for requesting repetition. The set of instructions, when executed by one or more processors of the base station, may cause the base station to receive the uplink shared channel based at least in part on the configuration information.

Some aspects described herein relate to an apparatus for wireless communication. The apparatus may include means for receiving configuration information indicating at least one of, a configuration for requesting repetition for an uplink shared channel transmitted after receiving a CFRA message, or a configuration for dropping one or more repetitions of the uplink shared channel. The apparatus may include means for requesting the repetition for the uplink shared channel if the configuration information indicates the configuration for requesting repetition. The apparatus may include means for transmitting the uplink shared channel based at least in part on the configuration information.

Some aspects described herein relate to an apparatus for wireless communication. The apparatus may include means for transmitting, to a UE, configuration information indicating at least one of, a configuration for requesting repetition for an uplink shared channel transmitted after receiving a CFRA message, or a configuration for dropping one or more repetitions of the uplink shared channel. The apparatus may include means for receiving a request for repetition for the uplink shared channel if the configuration information indicates the configuration for requesting repetition. The apparatus may include means for receiving the uplink shared channel based at least in part on the configuration information.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
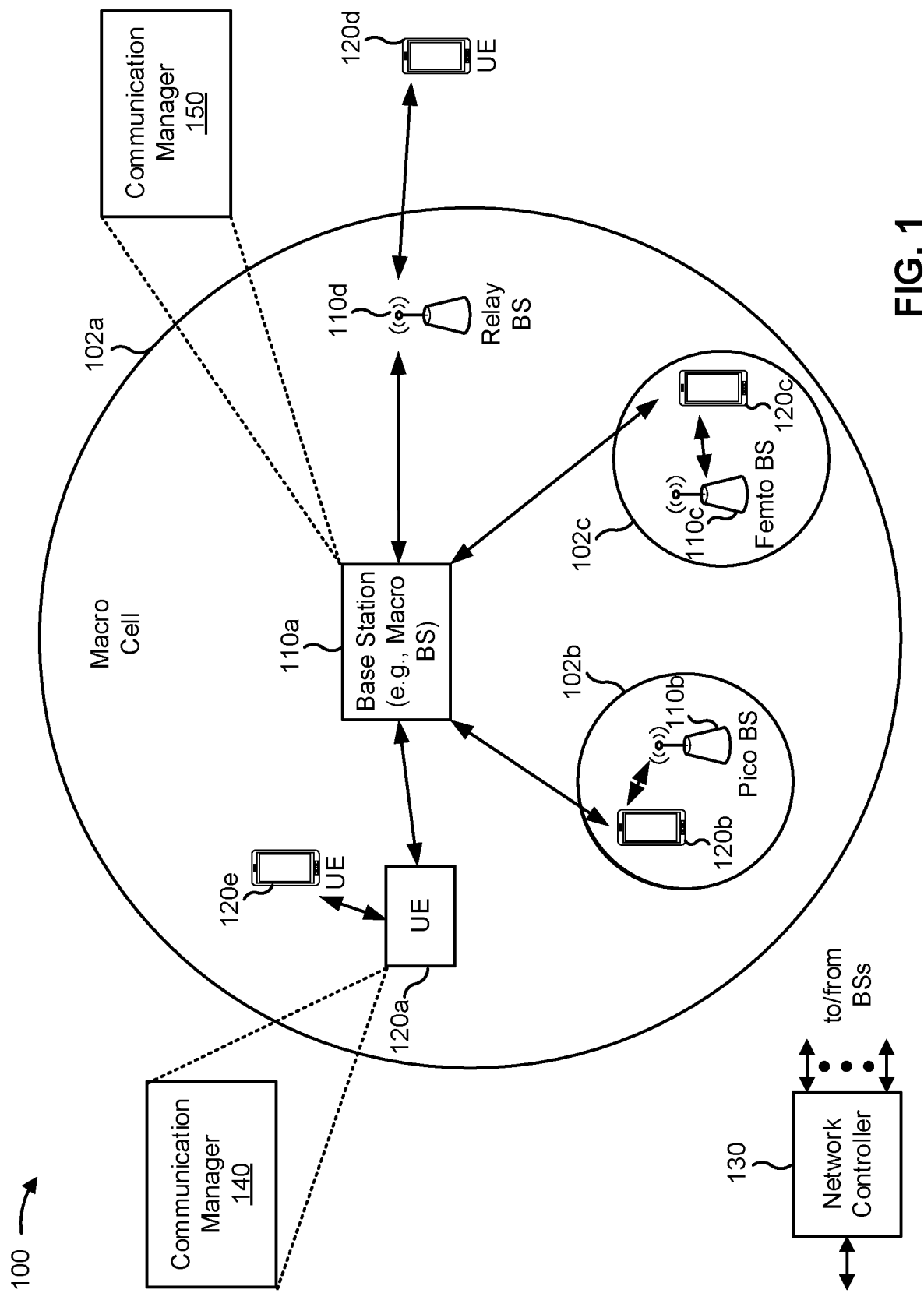
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a base station (BS) 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information indicating at least one of: a configuration for requesting repetition for an uplink shared channel transmitted after receiving a contention-free random access (CFRA) message, or a configuration for dropping one or more repetitions of the uplink shared channel; request the repetition for the uplink shared channel if the configuration information indicates the configuration for requesting repetition; and transmit the uplink shared channel based at least in part on the configuration information. Additionally, or alternatively, the communication manager 140 may perform one or more other operations described herein.

In some aspects, the base station 110 may include a communication manager 150. As described in more detail elsewhere herein, the communication manager 150 may transmit, to a UE, configuration information indicating at least one of: a configuration for requesting repetition for an uplink shared channel transmitted after receiving a CFRA message, or a configuration for dropping one or more repetitions of the uplink shared channel; receive a request for repetition for the uplink shared channel if the configuration information indicates the configuration for requesting repetition; and receive the uplink shared channel based at least in part on the configuration information. Additionally, or alternatively, the communication manager 150 may perform one or more other operations described herein.

As indicated above, FIG. 1 is provided as an example. Other examples may differ from what is described with regard to FIG. 1.

Figure 2:
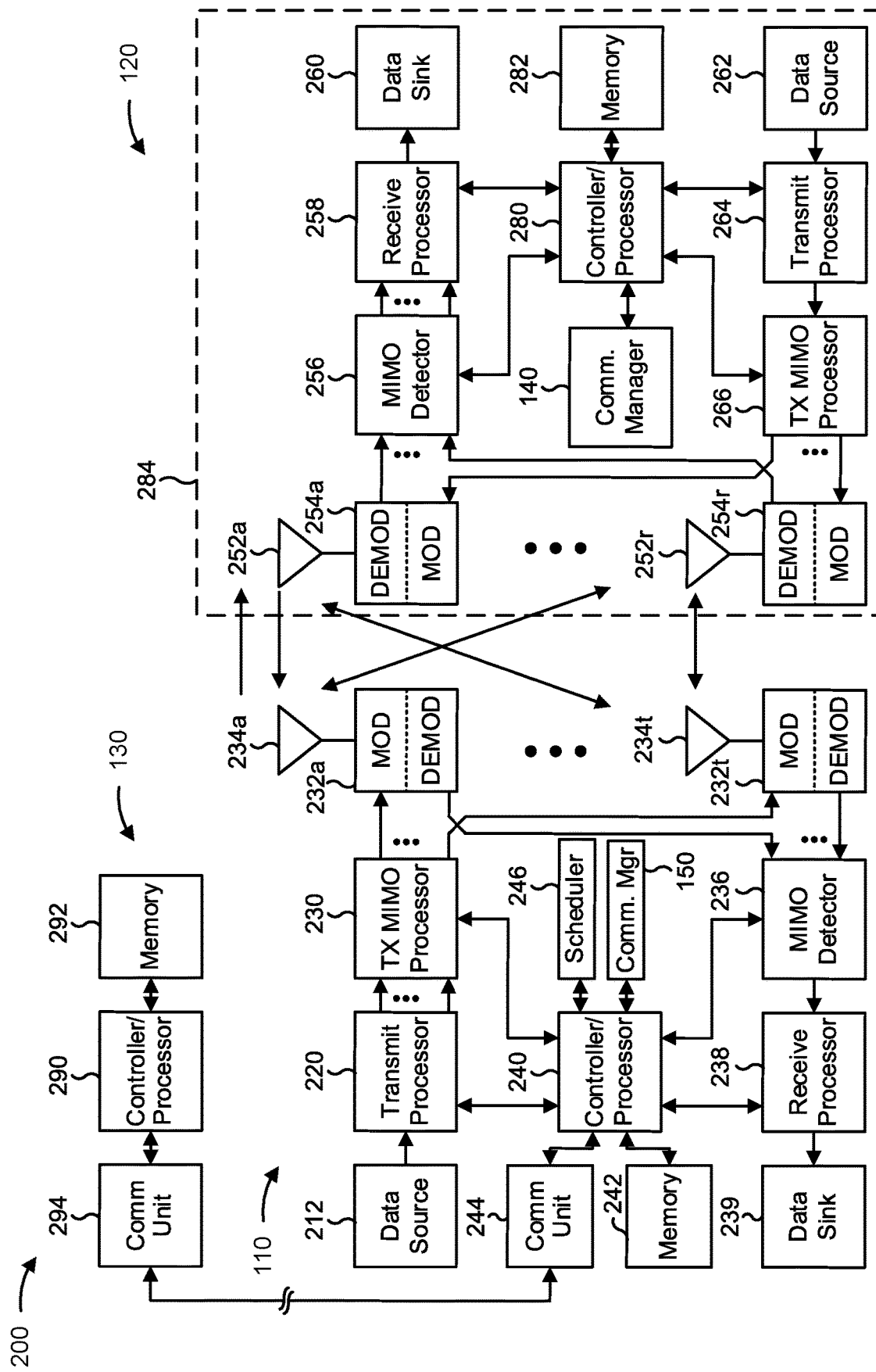
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with repetition-based contention-free random access, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples.

In some aspects, the UE 120 includes means for receiving configuration information indicating at least one of: a configuration for requesting repetition for an uplink shared channel transmitted after receiving a CFRA message, or a configuration for dropping one or more repetitions of the uplink shared channel; means for requesting the repetition for the uplink shared channel if the configuration information indicates the configuration for requesting repetition; and/or means for transmitting the uplink shared channel based at least in part on the configuration information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, configuration information indicating at least one of: a configuration for requesting repetition for an uplink shared channel transmitted after receiving a CFRA message, or a configuration for dropping one or more repetitions of the uplink shared channel; means for receiving a request for repetition for the uplink shared channel if the configuration information indicates the configuration for requesting repetition; and/or means for receiving the uplink shared channel based at least in part on the configuration information. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE may use a random access procedure for various network functions, including initial access, beam failure recovery, handover, secondary cell group setup, and so on. A random access procedure can be a contention-based random access (CBRA) procedure or a CFRA procedure. In a CBRA procedure, a UE selects a random access preamble from a pool of preambles shared with other UEs. In this case, the UE may select a preamble that has been selected by another UE, leading to contention. Contention is resolved by the base station. In a CFRA random access procedure, the base station allocates dedicated random access preamble(s) for each UE. This reduces the likelihood of UEs experiencing contention.

A UE provides uplink data via a physical uplink shared channel (PUSCH). In some cases, a UE may provide uplink data in association with a random access procedure, such as after a random access channel (RACH) message 2 is received from a base station. In this case, the PUSCH may be considered a message 3 (msg3) of the RACH procedure, or may be separate from the RACH procedure.

PUSCHs are susceptible to poor coverage, since the transmit power of a UE is generally limited by hardware constraints of the UE, applicable regulations, and so on. Furthermore, transmissions associated with RACH procedures are also susceptible to poor coverage for similar reasons. If a UE in a poor coverage scenario transmits a PUSCH in connection with a RACH procedure that is not successfully received, then a purpose associated with the RACH procedure, such as beam failure recovery, handover, or secondary cell group addition, may fail. Such a failure may lead to delays in operations of the UE, diminished throughput, and increased overhead.

Some techniques and apparatuses described herein provide a request for repetition of a PUSCH associated with a CFRA procedure, as well as rules and configurations for dropping repetitions of the PUSCH. For example, some techniques and apparatuses described herein provide for a UE to request repetition of a PUSCH, such as a configuration for requesting repetition. After requesting repetition, the UE may transmit the PUSCH using repetition. In some aspects, the UE may drop one or more repetitions of the PUSCH based at least in part on configured or specified rules, as described in more detail elsewhere herein. Furthermore, the request and configuration for the repetition of the PUSCH associated with the CFRA procedure can provide reduced overhead relative to some other forms of RACH procedures such as CBRA procedures.

Figure 3:
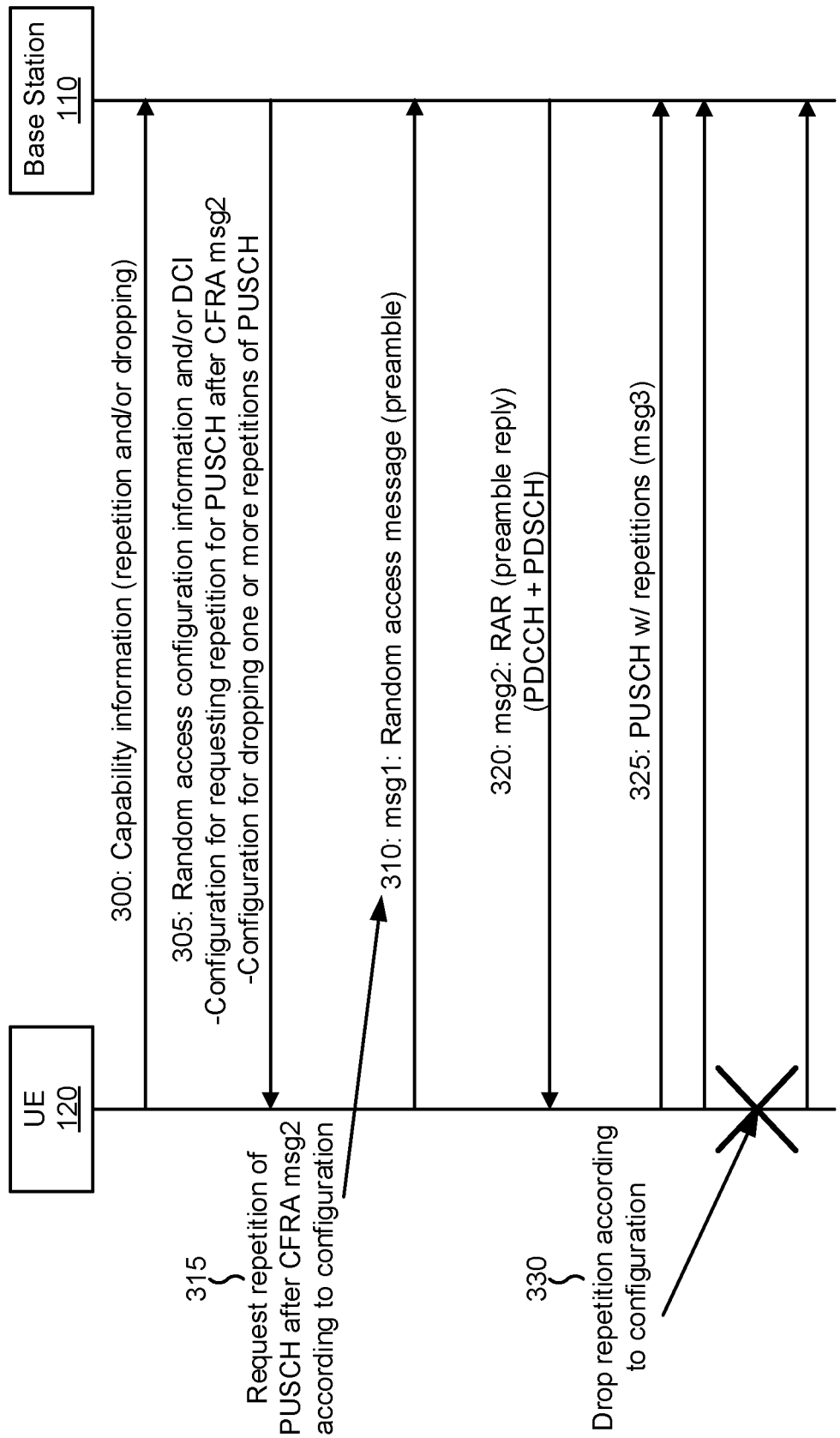
FIG. 3 is a diagram illustrating an example of a four-step random access procedure, in accordance with the present disclosure.

FIG. 3 is a diagram illustrating an example of a four-step random access procedure, in accordance with the present disclosure. As shown in FIG. 3, a base station 110 and a UE 120 may communicate with one another to perform the four-step random access procedure.

As mentioned above, a random access procedure can be a CBRA procedure or a CFRA procedure. FIG. 3 depicts a CFRA procedure. In a CBRA procedure, a UE selects a random access preamble from a pool of preambles shared with other UEs. In this case, the UE may select a preamble that has been selected by another UE, leading to contention. Contention is resolved by the base station. In a CFRA random access procedure, the base station allocates dedicated random access preamble(s) for each UE. This reduces the likelihood of UEs experiencing contention. Generally, the CFRA procedure may be performed after a radio resource control (RRC) connection has been established with the base station, whereas the CBRA procedure can be used for initial access and for transition to an RRC connected mode. A CFRA procedure can be used for purposes including handover, downlink data arrival while the UE is out-of-sync (such as based at least in part on a physical downlink control channel (PDCCH) order), on-demand system information, beam failure recovery, synchronous reconfiguration, and establishing time alignment during secondary cell addition. A CBRA procedure can be used for the same purposes as a CFRA, as well as purposes including initial access from RRC idle mode, transition from RRC inactive to RRC connected mode, RRC connection reestablishment, uplink data arrival while the UE is out-of-sync, uplink data arrival for a UE without a physical uplink control channel (PUCCH) resource allocation, and indication of scheduling request failure.

As shown by reference number 300, the UE 120 may transmit capability information, such as a UE capability information message. The capability information may indicate a set of capabilities of the UE 120. In some aspects, the capability information may indicate whether the UE 120 supports requesting repetition (or performing repetition) of a PUSCH after a msg2 of the CFRA procedure. Additionally, or alternatively, the capability information may indicate whether the UE 120 supports dropping one or more repetitions of the PUSCH, such as a configuration for dropping the one or more repetitions, a number of repetitions that can be dropped, or the like. The configuration information shown by reference number 305 may be based at least in part on the capability information, as described in more detail elsewhere herein.

In some aspects, the PUSCH may be a first PUSCH after the msg2 of the CFRA procedure. In some aspects, the PUSCH may be a msg3 of the CFRA procedure. In some aspects, the PUSCH may not be part of the CFRA procedure.

As shown by reference number 305, the base station 110 may transmit, and the UE 120 may receive, random access configuration information. In some aspects, the random access configuration information may be transmitted in an RRC message and/or a PDCCH order message that triggers a RACH procedure, such as for CFRA. The random access configuration information may include one or more parameters to be used in the random access procedure, such as one or more parameters for transmitting a random access message and/or one or more parameters for receiving a random access response.

In some aspects, the configuration information may indicate a configuration for requesting repetition for a PUSCH after RACH msg2. For example, the PUSCH after RACH msg2 (shown by reference number 325) may be a RACH msg3 of the RACH procedure, or may be separate from the RACH procedure. In some aspects, the configuration may indicate a preamble (such as a RACH preamble) for requesting repetition of the PUSCH (e.g., a RACH message including the indicated preamble may indicate to a base station 110 that the UE 120 intends to transmit the PUSCH with repetition). In some aspects, the configuration may indicate a RACH occasion for requesting repetition of the PUSCH (e.g., a RACH message transmitted on the indicated RACH occasion may indicate to a base station 110 that the UE 120 intends to transmit the PUSCH with repetition). In some aspects, the configuration may indicate a physical RACH (PRACH) transmission method for requesting repetition of the PUSCH. A PRACH transmission method may include a PRACH format for a PRACH transmission and/or whether repetition is used for a PRACH transmission. In some aspects, the configuration for how to request repetition of the PUSCH in the CFRA procedure may differ from a configuration for how to request repetition of the PUSCH in a CBRA procedure.

A RACH occasion (sometimes referred to as a PRACH occasion) is a resource on which the UE 120 can transmit a RACH message such as msg1 including a preamble. RACH occasions may be configured for the UE 120, such as by the configuration information shown by reference number 305. RACH occasions can be mapped to various parameters, such as a beam requested by the UE 120 in connection with a RACH procedure.

In some aspects, the configuration may indicate to request repetition of the PUSCH by repeating a RACH message. For example, the configuration may indicate to repeat a PRACH over two (or more) RACH occasions. The repetition can be in time, in frequency, spatial configuration, or a combination thereof. In some aspects, the two (or more) RACH occasions may be selected from a set of RACH occasions configured by the base station 110 (such as via the configuration information shown by reference number 305) as usable to request repetition of the PUSCH.

In some aspects, the configuration may indicate how to request frequency hopping for the PUSCH. "Frequency hopping" refers to transmitting different repetitions of a message (such as a PUSCH) using different frequency resources. Frequency hopping improves frequency diversity, thereby improving coverage. In some aspects, the configuration may indicate that the UE 120 can request frequency hopping. For example, transmitting a RACH message in multiple ways (such as using two or more RACH occasions, two or more preambles, or a combination thereof) may indicate that repetition of the PUSCH is requested with frequency hopping.

In some aspects, the configuration information may indicate how to differentiate a request for repetition of the PUSCH from an indication of a PUSCH to be transmitted without repetition. For example, the configuration information may indicate a first set of preambles for requesting repetition of the PUSCH, and a second set of preambles to indicate a PUSCH transmission without repetition. In this case, a combination of a preamble from the first set of preambles and the second set of preambles may indicate a third option, such as a request for repetition with a larger number of repetitions or a request for repetition with frequency hopping.

In some aspects, the configuration information may indicate a purpose associated with the repetition. For example, repetition of the PUSCH (and the corresponding request for repetition of the PUSCH) may be configured for particular purposes of CBRA procedures (purposes of CBRA procedures are defined elsewhere herein). For example, the configuration information may indicate whether the UE 120 should request repetition for a beam failure recovery purpose, a handover purpose, a secondary cell group setup purpose, and so on.

In some aspects, the configuration for requesting repetition may be based at least in part on capability information. For example, the base station 110 may provide the configuration for requesting repetition if the capability information indicates that the UE 120 supports repetition of the PUSCH and/or supports requesting repetition of the PUSCH. If the capability information indicates that the UE 120 does not support repetition or requesting repetition, or if the base station 110 does not receive the capability information, then the base station 110 may configure (or the UE 120 may use, without the base station configuring) a default configuration, such as a predefined configuration. For example, the default configuration may use a PUSCH transmission without repetition and may not permit the UE 120 to request repetition of the PUSCH.

As further shown by reference number 305, the configuration information may indicate a configuration for dropping one or more repetitions of the PUSCH. A repetition of a PUSCH can be dropped, for example, based at least in part on a cancellation indication, a dynamic slot format indication (SFI), or a PUCCH collision. A cancellation indication is an indication from a base station 110 to cancel an uplink transmission on a given resource. Cancellation indications enable the base station 110 to prioritize other traffic on the given resource. A dynamic SFI indicates a slot format (such as uplink symbols and downlink symbols for one or more slots) and can be indicated via dynamic signaling. If a slot's format is changed due to a dynamic SFI to one that cannot support PUSCH transmission, then a PUSCH scheduled for transmission on the slot may be dropped. A PUCCH collision may occur when a PUCCH at least partially overlaps with a repetition of the PUSCH. Since PUCCHs are generally treated as higher priority than PUSCHs, the PUSCH may be dropped in this scenario.

In one example, the configuration information may indicate that a repetition of the PUSCH should be dropped in the case of a cancellation indication and/or a collision with one or more downlink symbols as indicated by dynamic SFI.

In some aspects, the configuration may indicate how to count a number of repetitions of the PUSCH, such as based at least in part on a number of slots or uplink slots available for uplink transmission in accordance with a cell-level semi-static time division duplexing (TDD) configuration (as may be used for a CBRA Msg3), or based at least in part on a number of available slots taking into account dynamic SFI and/or other factors (as may be used for a unicast PUSCH).

If the UE 120 does not receive the configuration for dropping the one or more repetitions, the UE 120 may use a default configuration, such as a configuration specified in a wireless communication specification or in a system information block. The default configuration may indicate one or more rules for dropping a repetition. For example, the default configuration may indicate whether a repetition is to be dropped if the repetition overlaps with a cancellation indication. As another example, the default configuration may indicate whether a repetition is to be dropped if the repetition is impacted by a dynamic SFI. As yet another example, the default configuration may indicate whether a repetition is to be dropped if the repetition overlaps with a PUCCH. In some aspects, the default configuration may indicate how to count a number of repetitions of the PUSCH, such as based at least in part on a number of available slots for uplink transmission in accordance with a cell-level semi-static TDD configuration.

In some aspects, the default configuration may indicate that a cancellation indication or an SFI is to be ignored (e.g., a corresponding PUSCH repetition is not to be dropped) until transmission of the PUSCH repetition is complete (e.g., finished). In some other aspects, rules for dropping repetitions of a PUSCH may be based at least in part on a combination of a default configuration and the configuration information shown by reference number 305. For example, the UE 120 may receive the configuration information. A default configuration may indicate how to handle a first type of conflict such as a cancellation indication (e.g., to drop a corresponding PUSCH), and the configuration information may indicate how to handle a second type of conflict such as a PUCCH collision (e.g., due to a periodic channel state information (CSI) transmission on the PUCCH) (e.g., dropping in case of PUCCH collision may depend on RRC configuration).

In some aspects, the configuration for dropping the one or more repetitions may be based at least in part on capability information. For example, the base station 110 may provide the configuration for dropping the one or more repetitions if the capability information indicates that the UE 120 supports dropping the one or more repetitions. If the capability information indicates that the UE 120 does not support dropping the one or more repetitions, or if the base station 110 does not receive the capability information, then the base station 110 may configure (or the UE 120 may use, without the base station configuring) a default configuration, such as a predefined configuration. For example, the default configuration may indicate to ignore a type of conflict (e.g., one or more of cancellation indications, dynamic SFI conflicts, or PUCCH collisions). This default configuration may be the same as, or may be different from, the default configuration used in the absence of or in conjunction with the UE 120 receiving the configuration information, which was described above.

As further shown by reference number 305, the base station 110 may transmit, and the UE 120 may receive, downlink control information (DCI). For example, the DCI may order the CFRA procedure (e.g., in a PDCCH order). In some aspects, the DCI may include a dynamic SFI.

As shown by reference number 310, the UE 120 may transmit a random access message (sometimes referred to as a RACH message or a PRACH message), which may include a preamble (sometimes referred to as a random access preamble, a PRACH preamble, or a random access message (RAM) preamble). The message that includes the preamble may be referred to as a message 1, msg1, Msg1, MSG1, a first message, or an initial message in a four-step random access procedure. The random access message may include a random access preamble identifier.

As shown by reference number 315, the random access message may indicate a request for repetition. The request for repetition may be in accordance with the configuration information shown by reference number 305. For example, the request for repetition may be transmitted using one or more preambles, one or more RACH occasions, a PRACH transmission method, or the like, as indicated by the configuration information.

As shown by reference number 320, the base station 110 may transmit a random access response as a reply to the preamble. The message that includes the random access response may be referred to as a CFRA message, message 2, Msg2, msg2, MSG2, or a second message in a four-step random access procedure. In some aspects, the random access response may indicate the detected random access preamble identifier (e.g., received from the UE 120 in msg1). Additionally, or alternatively, the random access response may indicate a resource allocation to be used by the UE 120 to transmit message 3 (msg3). In some aspects, the random access response may indicate a plurality of resource allocations for repetitions of msg3. For example, the random access response may indicate recurring resource allocations, resource allocations in accordance with frequency hopping (if requested by the UE 120), or the like.

In some aspects, as part of the second step of the four-step random access procedure, the base station 110 may transmit a PDCCH communication for the random access response. The PDCCH communication may schedule a physical downlink shared channel (PDSCH) communication that includes the random access response. For example, the PDCCH communication may indicate a resource allocation for the PDSCH communication. Also, as part of the second step of the four-step random access procedure, the base station 110 may transmit the PDSCH communication for the random access response, as scheduled by the PDCCH communication. The random access response may be included in a MAC protocol data unit (PDU) of the PDSCH communication.

As shown by reference number 325, the UE 120 may transmit a third message, which may be referred to as message 3, msg3, MSG3, or a third message of a four-step random access procedure. The third message may include a PUSCH. As further shown, the UE 120 may transmit multiple repetitions of the third message. As shown by reference number 330, in some aspects, the UE 120 may drop a repetition according to the configuration for dropping the one or more repetitions. For example, the UE 120 may identify a cancellation indication that conflicts with a repetition, a dynamic SFI that conflicts with a repetition, a PUCCH that conflicts with a repetition, or the like. The UE 120 may selectively drop the repetition or ignore the cancellation indication, dynamic SFI, or PUCCH, according to the configuration information. In some aspects, the UE 120 may perform counting of repetitions in accordance with the configuration information, as described elsewhere herein.

In this way, coverage of uplink messages associated with CFRA procedures is improved, which improves throughput and reduces the likelihood of failure of the CFRA procedures.

As indicated above, FIG. 3 is provided as an example. Other examples may differ from what is described with regard to FIG. 3.

Figure 4:
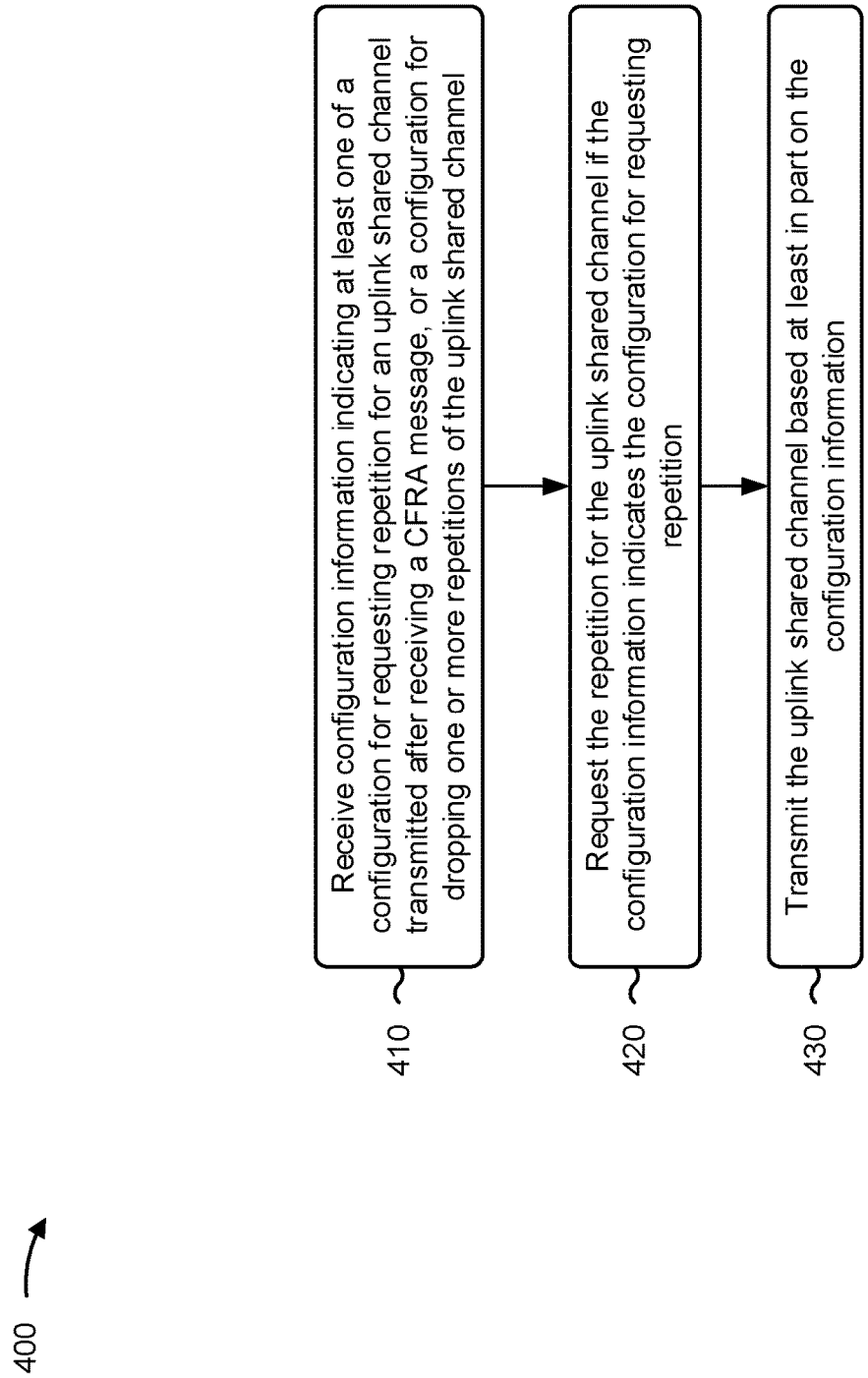
FIG. 4 is a diagram illustrating an example process performed, for example, by a UE, in accordance with the present disclosure.

FIG. 4 is a diagram illustrating an example process 400 performed, for example, by an apparatus of a UE, in accordance with the present disclosure. Example process 400 is an example where the UE (e.g., UE 120) performs operations associated with repetition-based contention-free random access.

As shown in FIG. 4, in some aspects, process 400 may include receiving configuration information indicating at least one of: a configuration for requesting repetition for an uplink shared channel transmitted after receiving a CFRA message, or a configuration for dropping one or more repetitions of the uplink shared channel (block 410). For example, the UE (e.g., using communication manager 140 and/or reception component 602, depicted in FIG. 6) may receive configuration information indicating at least one of: a configuration for requesting repetition for an uplink shared channel transmitted after receiving a CFRA message (e.g., a RACH message 2), or a configuration for dropping one or more repetitions of the uplink shared channel, as described above.

As further shown in FIG. 4, in some aspects, process 400 may include requesting the repetition for the uplink shared channel if the configuration information indicates the configuration for requesting repetition (block 420). For example, the UE (e.g., using communication manager 140 and/or repetition component 608, depicted in FIG. 6) may request the repetition for the uplink shared channel if the configuration information indicates the configuration for requesting repetition, as described above.

As further shown in FIG. 4, in some aspects, process 400 may include transmitting the uplink shared channel based at least in part on the configuration information (block 430). For example, the UE (e.g., using communication manager 140 and/or transmission component 604, depicted in FIG. 6) may transmit the uplink shared channel based at least in part on the configuration information, as described above.

Process 400 may include additional aspects, such as any single aspect or any combination of aspects described below and/or in connection with one or more other processes described elsewhere herein.

In a first aspect, transmitting the uplink shared channel based at least in part on the configuration information further comprises transmitting repetitions of the uplink shared channel based at least in part on requesting the repetition for the uplink shared channel.

In a second aspect, alone or in combination with the first aspect, the configuration for requesting repetition indicates at least one of a preamble for a message requesting the repetition, a RACH occasion for the message requesting the repetition, or a PRACH transmission method for the message requesting the repetition.

In a third aspect, alone or in combination with one or more of the first and second aspects, the configuration for requesting repetition indicates that a PRACH transmission is to be repeated on two or more RACH occasions.

In a fourth aspect, alone or in combination with one or more of the first through third aspects, the two or more RACH occasions include at least one of two or more time occasions, or two or more frequency occasions.

In a fifth aspect, alone or in combination with one or more of the first through fourth aspects, the two or more RACH occasions are selected from a set of RACH occasions configured for requesting repetition.

In a sixth aspect, alone or in combination with one or more of the first through fifth aspects, the configuration for requesting repetition indicates a configuration for requesting frequency hopping for repetitions of the uplink shared channel.

In a seventh aspect, alone or in combination with one or more of the first through sixth aspects, the configuration for requesting repetition for the uplink shared channel is a first configuration that indicates a first preamble, and wherein the configuration information indicates a second configuration associated with a second preamble for transmitting the uplink shared channel without repetition.

In an eighth aspect, alone or in combination with one or more of the first through seventh aspects, process 400 includes transmitting one or more messages including the first preamble and the second preamble, wherein the one or more messages including the first preamble and the second preamble indicate a request for repetition with a modified configuration.

In a ninth aspect, alone or in combination with one or more of the first through eighth aspects, at least one of receiving the configuration information or requesting the repetition for the uplink shared channel is based at least in part on a purpose associated with the CFRA message.

In a tenth aspect, alone or in combination with one or more of the first through ninth aspects, process 400 includes transmitting capability information indicating support for requesting the repetition, wherein the configuration information is based at least in part on the capability information.

In an eleventh aspect, alone or in combination with one or more of the first through tenth aspects, based at least in part on the UE not transmitting capability information indicating support for requesting the repetition, the configuration information uses a default configuration.

In a twelfth aspect, alone or in combination with one or more of the first through eleventh aspects, transmitting the uplink shared channel based at least in part on the configuration information comprises transmitting one or more repetitions of the uplink shared channel, wherein at least one repetition of the uplink shared channel is dropped in accordance with the configuration information.

In a thirteenth aspect, alone or in combination with one or more of the first through twelfth aspects, process 400 includes dropping at least one repetition of the uplink shared channel in accordance with the configuration information based at least in part on at least one of a cancellation indication, a dynamic slot format indication, or a physical uplink control channel collision.

In a fourteenth aspect, alone or in combination with one or more of the first through thirteenth aspects, dropping the at least one repetition of the uplink shared channel is based at least in part on a counting configuration, wherein the counting configuration is based at least in part on a set of available slots according to a cell-level time division duplexing configuration.

In a fifteenth aspect, alone or in combination with one or more of the first through fourteenth aspects, dropping the at least one repetition of the uplink shared channel is based at least in part on a counting configuration, wherein the counting configuration is based at least in part on a counting configuration for a unicast uplink shared channel.

In a sixteenth aspect, alone or in combination with one or more of the first through fifteenth aspects, the configuration information does not indicate the configuration for dropping one or more repetitions, and wherein transmitting the uplink shared channel further comprises ignoring a cancellation indication or a dynamic slot format indication prior to completing transmission of the uplink shared channel, wherein a counting configuration associated with the uplink shared channel is based at least in part on a set of available slots according to a cell-level time division duplexing configuration.

In a seventeenth aspect, alone or in combination with one or more of the first through sixteenth aspects, the UE is pre-configured with whether to drop a repetition of the uplink shared channel for a first type of conflict, and wherein the configuration information indicates whether to drop the repetition of the uplink shared channel for a second type of conflict.

In an eighteenth aspect, alone or in combination with one or more of the first through seventeenth aspects, process 400 includes transmitting capability information indicating support for dropping the one or more repetitions, wherein the configuration information is based at least in part on the capability information.

In a nineteenth aspect, alone or in combination with one or more of the first through eighteenth aspects, the configuration information is based at least in part on a default configuration based at least in part on the UE not transmitting capability information indicating support for dropping the one or more repetitions.

In a twentieth aspect, alone or in combination with one or more of the first through nineteenth aspects, the default configuration indicates not to drop the one or more repetitions for at least one of a cancellation indication, a dynamic slot format indication, or a physical uplink control channel collision.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
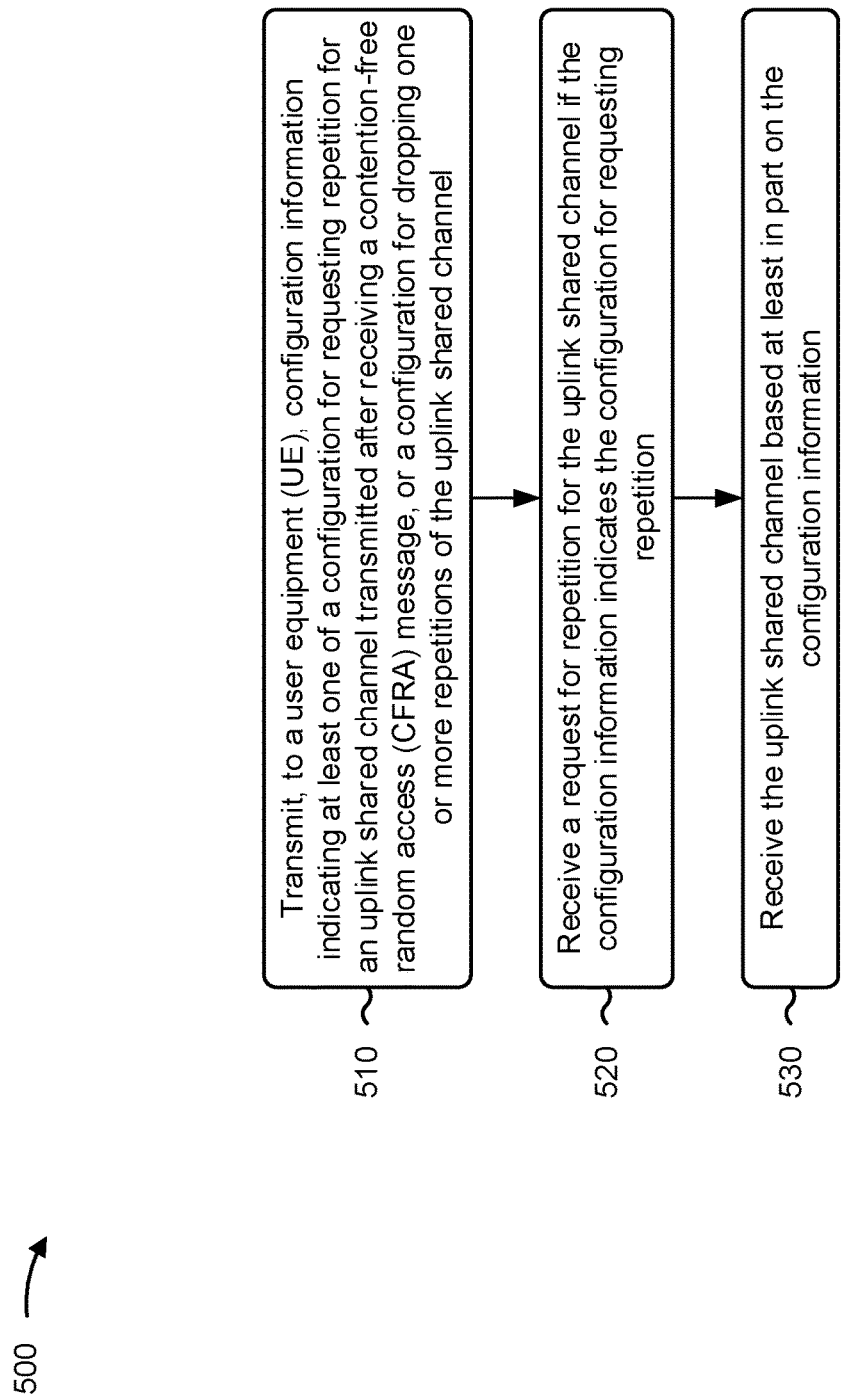
FIG. 5 is a diagram illustrating an example process performed, for example, by a base station, in accordance with the present disclosure.

FIG. 5 is a diagram illustrating an example process 500 performed, for example, by an apparatus of a base station, in accordance with the present disclosure. Example process 500 is an example where the base station (e.g., base station 110) performs operations associated with repetition-based contention-free random access.

As shown in FIG. 5, in some aspects, process 500 may include transmitting, to a UE, configuration information indicating at least one of: a configuration for requesting repetition for an uplink shared channel transmitted after receiving a CFRA message, or a configuration for dropping one or more repetitions of the uplink shared channel (block 510). For example, the base station (e.g., using communication manager 150 and/or transmission component 704, depicted in FIG. 7) may transmit, to a UE, configuration information indicating at least one of: a configuration for requesting repetition for an uplink shared channel transmitted after receiving a CFRA message, or a configuration for dropping one or more repetitions of the uplink shared channel, as described above.

As further shown in FIG. 5, in some aspects, process 500 may include receiving a request for repetition for the uplink shared channel if the configuration information indicates the configuration for requesting repetition (block 520). For example, the base station (e.g., using communication manager 150 and/or reception component 702, depicted in FIG. 7) may receive a request for repetition for the uplink shared channel if the configuration information indicates the configuration for requesting repetition, as described above.

As further shown in FIG. 5, in some aspects, process 500 may include receiving the uplink shared channel based at least in part on the configuration information (block 530). For example, the base station (e.g., using communication manager 150 and/or reception component 702, depicted in FIG. 7) may receive the uplink shared channel based at least in part on the configuration information, as described above.

Process 500 may include additional aspects, such as any single aspect or any combination of aspects described below and/or in connection with one or more other processes described elsewhere herein.

In a first aspect, process 500 includes transmitting a random access message indicating a resource allocation to be used by the UE to transmit repetitions of the uplink shared channel.

In a second aspect, alone or in combination with the first aspect, receiving the uplink shared channel based at least in part on the configuration information further comprises receiving repetitions of the uplink shared channel based at least in part on requesting the repetition for the uplink shared channel.

In a third aspect, alone or in combination with one or more of the first and second aspects, the configuration for requesting repetition indicates at least one of a preamble for a message requesting the repetition, a RACH occasion for the message requesting the repetition, or a PRACH transmission method for the message requesting the repetition.

In a fourth aspect, alone or in combination with one or more of the first through third aspects, the configuration for requesting repetition indicates that a PRACH transmission is to be repeated on two or more RACH occasions.

In a fifth aspect, alone or in combination with one or more of the first through fourth aspects, the two or more RACH occasions include at least one of two or more time occasions, or two or more frequency occasions.

In a sixth aspect, alone or in combination with one or more of the first through fifth aspects, the two or more RACH occasions are selected from a set of RACH occasions configured for requesting repetition.

In a seventh aspect, alone or in combination with one or more of the first through sixth aspects, the configuration for requesting repetition indicates a configuration for requesting frequency hopping for repetitions of the uplink shared channel.

In an eighth aspect, alone or in combination with one or more of the first through seventh aspects, the configuration for requesting repetition for the uplink shared channel is a first configuration that indicates a first preamble, and wherein the configuration information indicates a second configuration associated with a second preamble for transmitting the uplink shared channel without repetition.

In a ninth aspect, alone or in combination with one or more of the first through eighth aspects, process 500 includes receiving one or more messages including the first preamble and the second preamble, wherein the one or more messages including the first preamble and the second preamble indicate a request for repetition with a modified configuration.

In a tenth aspect, alone or in combination with one or more of the first through ninth aspects, at least one of receiving the configuration information or requesting the repetition for the uplink shared channel is based at least in part on a purpose associated with the CFRA message.

In an eleventh aspect, alone or in combination with one or more of the first through tenth aspects, process 500 includes receiving capability information indicating support for requesting the repetition, wherein the configuration information is based at least in part on the capability information.

In a twelfth aspect, alone or in combination with one or more of the first through eleventh aspects, based at least in part on the base station not receiving capability information indicating support for requesting the repetition, the configuration information uses a default configuration.

In a thirteenth aspect, alone or in combination with one or more of the first through twelfth aspects, receiving the uplink shared channel based at least in part on the configuration information comprises receiving one or more repetitions of the uplink shared channel, wherein at least one repetition of the uplink shared channel has been dropped in accordance with the configuration information.

In a fourteenth aspect, alone or in combination with one or more of the first through thirteenth aspects, the configuration information indicates to drop the at least one repetition based at least in part on at least one of a cancellation indication, a dynamic slot format indication, or a physical uplink control channel collision.

In a fifteenth aspect, alone or in combination with one or more of the first through fourteenth aspects, dropping the at least one repetition of the uplink shared channel is based at least in part on a counting configuration, wherein the counting configuration is based at least in part on a set of available slots according to a cell-level time division duplexing configuration.

In a sixteenth aspect, alone or in combination with one or more of the first through fifteenth aspects, dropping the at least one repetition of the uplink shared channel is based at least in part on a counting configuration, wherein the counting configuration is based at least in part on a counting configuration for a unicast uplink shared channel.

In a seventeenth aspect, alone or in combination with one or more of the first through sixteenth aspects, the UE is pre-configured with whether to drop a repetition of the uplink shared channel for a first type of conflict, and wherein the configuration information indicates whether to drop the repetition of the uplink shared channel for a second type of conflict.

In an eighteenth aspect, alone or in combination with one or more of the first through seventeenth aspects, process 500 includes receiving capability information indicating support for dropping the one or more repetitions, wherein the configuration information is based at least in part on the capability information.

In a nineteenth aspect, alone or in combination with one or more of the first through eighteenth aspects, the configuration information is based at least in part on a default configuration based at least in part on the base station not receiving capability information indicating support for dropping the one or more repetitions.

In a twentieth aspect, alone or in combination with one or more of the first through nineteenth aspects, the default configuration indicates not to drop the one or more repetitions for at least one of a cancellation indication, a dynamic slot format indication, or a physical uplink control channel collision.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
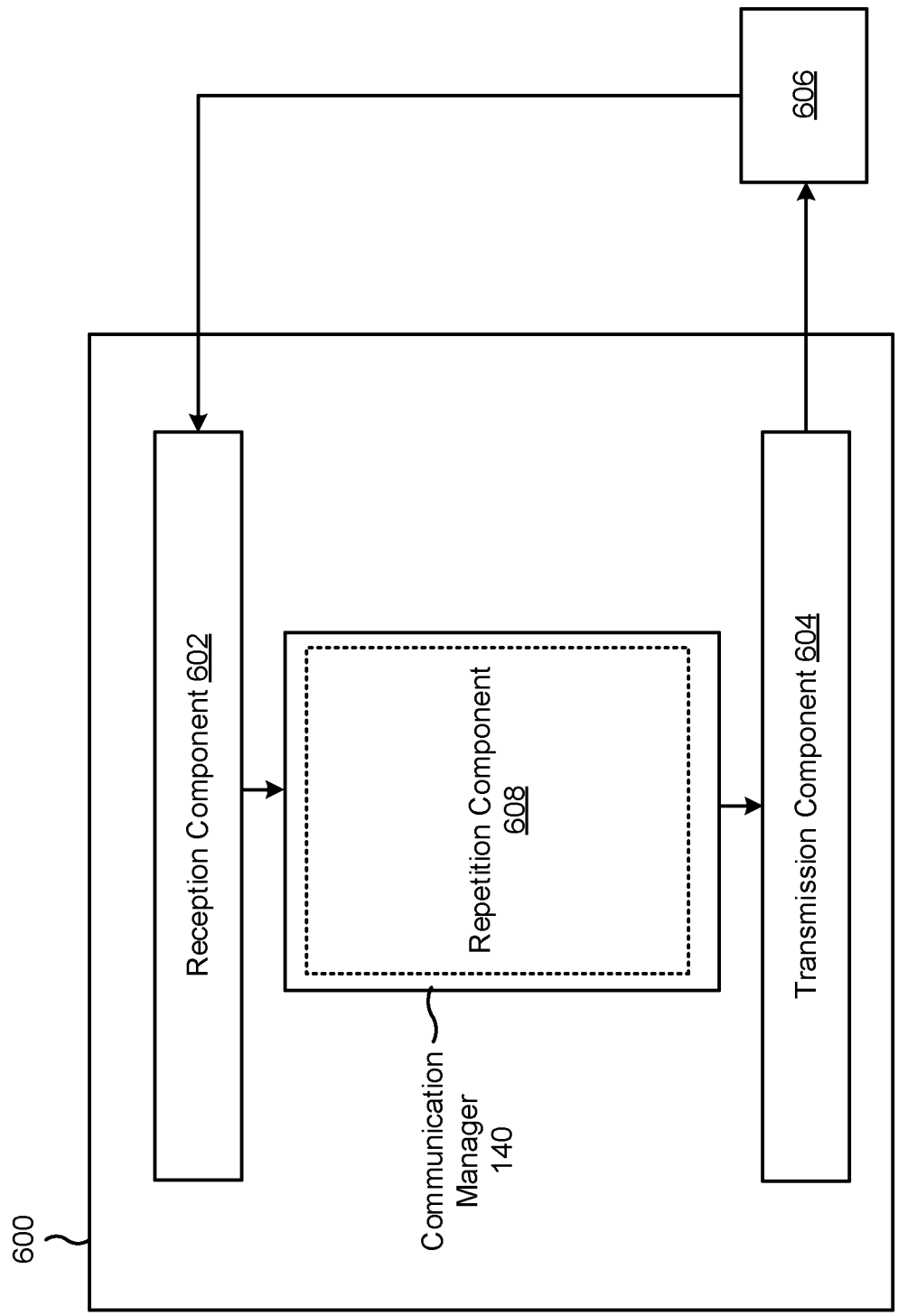
FIGS. 6-7 are diagrams of example apparatuses for wireless communication, in accordance with the present disclosure.

FIG. 6 is a diagram of an example apparatus 600 for wireless communication, in accordance with the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include a repetition component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4, or a combination thereof. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The reception component 602 may receive configuration information indicating at least one of a configuration for requesting repetition for an uplink shared channel transmitted after receiving a CFRA message, or a configuration for dropping one or more repetitions of the uplink shared channel. The repetition component 608 may request the repetition for the uplink shared channel if the configuration information indicates the configuration for requesting repetition. The transmission component 604 may transmit the uplink shared channel based at least in part on the configuration information.

The transmission component 604 may transmit one or more messages including the first preamble and the second preamble, wherein the one or more messages including the first preamble and the second preamble indicate a request for repetition with a modified configuration.

The transmission component 604 may transmit capability information indicating support for requesting the repetition, wherein the configuration information is based at least in part on the capability information.

The repetition component 608 may drop at least one repetition of the uplink shared channel in accordance with the configuration information based at least in part on at least one of a cancellation indication, a dynamic slot format indication, or a physical uplink control channel collision.

The transmission component 604 may transmit capability information indicating support for dropping the one or more repetitions, wherein the configuration information is based at least in part on the capability information.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
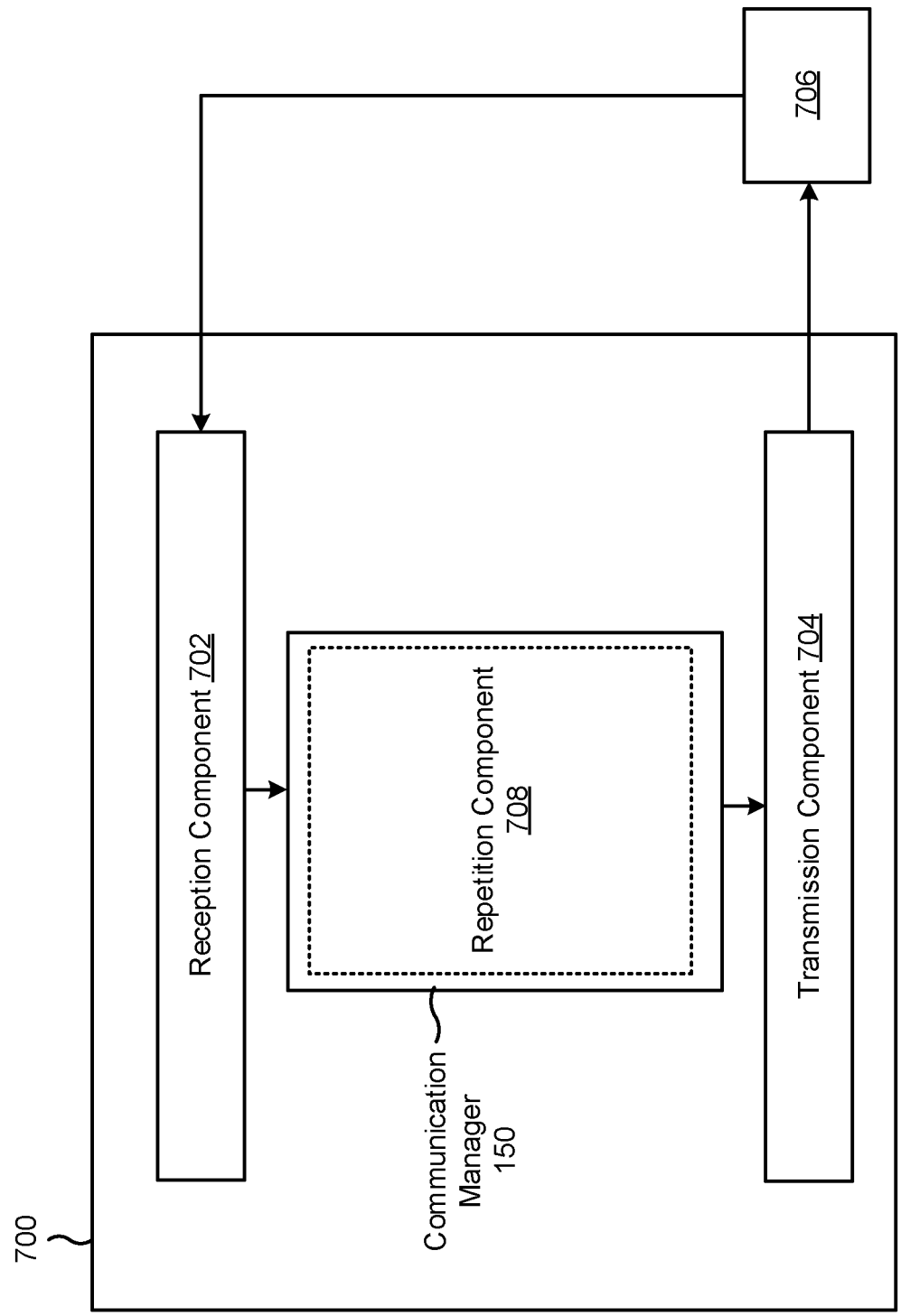

FIG. 7 is a diagram of an example apparatus 700 for wireless communication, in accordance with the present disclosure. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 150. The communication manager 150 may include a repetition component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the base station described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the base station described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the base station described in connection with FIG. 2. In some aspects, the transmission component 704 may be co-located with the reception component 702 in a transceiver.

The transmission component 704 may transmit, to a UE, configuration information indicating at least one of a configuration for requesting repetition for an uplink shared channel transmitted after receiving a CFRA message, or a configuration for dropping one or more repetitions of the uplink shared channel. The reception component 702 may receive a request for repetition for the uplink shared channel if the configuration information indicates the configuration for requesting repetition. The reception component 702 may receive the uplink shared channel based at least in part on the configuration information.

The transmission component 704 may transmit a random access message indicating a resource allocation to be used by the UE to transmit repetitions of the uplink shared channel.

The reception component 702 may receive one or more messages including the first preamble and the second preamble, wherein the one or more messages including the first preamble and the second preamble indicate a request for repetition with a modified configuration.

The reception component 702 may receive capability information indicating support for requesting the repetition, wherein the configuration information is based at least in part on the capability information.

The reception component 702 may receive capability information indicating support for dropping the one or more repetitions, wherein the configuration information is based at least in part on the capability information.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving configuration information indicating at least one of: a configuration for requesting repetition for an uplink shared channel transmitted after receiving a contention-free random access (CFRA) message, or a configuration for dropping one or more repetitions of the uplink shared channel; requesting the repetition for the uplink shared channel if the configuration information indicates the configuration for requesting repetition; and transmitting the uplink shared channel based at least in part on the configuration information.

Aspect 2: The method of Aspect 1, wherein transmitting the uplink shared channel based at least in part on the configuration information further comprises: transmitting repetitions of the uplink shared channel based at least in part on requesting the repetition for the uplink shared channel.

Aspect 3: The method of any of Aspects 1-2, wherein the configuration for requesting repetition indicates at least one of: a preamble for a message requesting the repetition, a random access channel (RACH) occasion for the message requesting the repetition, or a physical RACH (PRACH) transmission method for the message requesting the repetition.

Aspect 4: The method of any of Aspects 1-3, wherein the configuration for requesting repetition indicates that a physical random access channel (PRACH) transmission is to be repeated on two or more random access channel (RACH) occasions.

Aspect 5: The method of Aspect 4, wherein the two or more RACH occasions include at least one of: two or more time occasions, or two or more frequency occasions.

Aspect 6: The method of Aspect 4, wherein the two or more RACH occasions are selected from a set of RACH occasions configured for requesting repetition.

Aspect 7: The method of any of Aspects 1-6, wherein the configuration for requesting repetition indicates a configuration for requesting frequency hopping for repetitions of the uplink shared channel.

Aspect 8: The method of any of Aspects 1-7, wherein the configuration for requesting repetition for the uplink shared channel is a first configuration that indicates a first preamble, and wherein the configuration information indicates a second configuration associated with a second preamble for transmitting the uplink shared channel without repetition.

Aspect 9: The method of Aspect 8, further comprising: transmitting one or more messages including the first preamble and the second preamble, wherein the one or more messages including the first preamble and the second preamble indicate a request for repetition with a modified configuration.

Aspect 10: The method of any of Aspects 1-9, wherein at least one of receiving the configuration information or requesting the repetition for the uplink shared channel is based at least in part on a purpose associated with the CFRA message.

Aspect 11: The method of any of Aspects 1-10, further comprising: transmitting capability information indicating support for requesting the repetition, wherein the configuration information is based at least in part on the capability information.

Aspect 12: The method of any of Aspects 1-11, wherein, based at least in part on the UE not transmitting capability information indicating support for requesting the repetition, the configuration information uses a default configuration.

Aspect 13: The method of any of Aspects 1-12, wherein transmitting the uplink shared channel based at least in part on the configuration information comprises: transmitting one or more repetitions of the uplink shared channel, wherein at least one repetition of the uplink shared channel is dropped in accordance with the configuration information.

Aspect 14: The method of any of Aspects 1-13, further comprising: dropping at least one repetition of the uplink shared channel in accordance with the configuration information based at least in part on at least one of: a cancellation indication, a dynamic slot format indication, or a physical uplink control channel collision.

Aspect 15: The method of Aspect 14, wherein dropping the at least one repetition of the uplink shared channel is based at least in part on a counting configuration, wherein the counting configuration is based at least in part on a set of available slots according to a cell-level time division duplexing configuration.

Aspect 16: The method of Aspect 14, wherein dropping the at least one repetition of the uplink shared channel is based at least in part on a counting configuration, wherein the counting configuration is based at least in part on a counting configuration for a unicast uplink shared channel.

Aspect 17: The method of any of Aspects 1-16, wherein the configuration information does not indicate the configuration for dropping one or more repetitions, and wherein transmitting the uplink shared channel further comprises: ignoring a cancellation indication or a dynamic slot format indication prior to completing transmission of the uplink shared channel, wherein a counting configuration associated with the uplink shared channel is based at least in part on a set of available slots according to a cell-level time division duplexing configuration.

Aspect 18: The method of any of Aspects 1-17, wherein the UE is pre-configured with whether to drop a repetition of the uplink shared channel for a first type of conflict, and wherein the configuration information indicates whether to drop the repetition of the uplink shared channel for a second type of conflict.

Aspect 19: The method of any of Aspects 1-18, further comprising: transmitting capability information indicating support for dropping the one or more repetitions, wherein the configuration information is based at least in part on the capability information.

Aspect 20: The method of any of Aspects 1-19, wherein the configuration information is based at least in part on a default configuration based at least in part on the UE not transmitting capability information indicating support for dropping the one or more repetitions.

Aspect 21: The method of Aspect 20, wherein the default configuration indicates not to drop the one or more repetitions for at least one of: a cancellation indication, a dynamic slot format indication, or a physical uplink control channel collision.

Aspect 22: A method of wireless communication performed by a base station, comprising: transmitting, to a user equipment (UE), configuration information indicating at least one of: a configuration for requesting repetition for an uplink shared channel transmitted after receiving a contention-free random access (CFRA) message, or a configuration for dropping one or more repetitions of the uplink shared channel; receiving a request for repetition for the uplink shared channel if the configuration information indicates the configuration for requesting repetition; and receiving the uplink shared channel based at least in part on the configuration information.

Aspect 23: The method of Aspect 22, further comprising: transmitting a random access message indicating a resource allocation to be used by the UE to transmit repetitions of the uplink shared channel.

Aspect 24: The method of any of Aspects 22-23, wherein receiving the uplink shared channel based at least in part on the configuration information further comprises: receiving repetitions of the uplink shared channel based at least in part on requesting the repetition for the uplink shared channel.

Aspect 25: The method of any of Aspects 22-24, wherein the configuration for requesting repetition indicates at least one of: a preamble for a message requesting the repetition, a random access channel (RACH) occasion for the message requesting the repetition, or a physical RACH (PRACH) transmission method for the message requesting the repetition.

Aspect 26: The method of any of Aspects 22-25, wherein the configuration for requesting repetition indicates that a physical random access channel (PRACH) transmission is to be repeated on two or more random access channel (RACH) occasions.

Aspect 27: The method of Aspect 26, wherein the two or more RACH occasions include at least one of: two or more time occasions, or two or more frequency occasions.

Aspect 28: The method of Aspect 26, wherein the two or more RACH occasions are selected from a set of RACH occasions configured for requesting repetition.

Aspect 29: The method of any of Aspects 22-28, wherein the configuration for requesting repetition indicates a configuration for requesting frequency hopping for repetitions of the uplink shared channel.

Aspect 30: The method of any of Aspects 22-29, wherein the configuration for requesting repetition for the uplink shared channel is a first configuration that indicates a first preamble, and wherein the configuration information indicates a second configuration associated with a second preamble for transmitting the uplink shared channel without repetition.

Aspect 31: The method of Aspect 30, further comprising: receiving one or more messages including the first preamble and the second preamble, wherein the one or more messages including the first preamble and the second preamble indicate a request for repetition with a modified configuration.

Aspect 32: The method of any of Aspects 22-31, wherein at least one of receiving the configuration information or requesting the repetition for the uplink shared channel is based at least in part on a purpose associated with the CFRA message.

Aspect 33: The method of any of Aspects 22-32, further comprising: receiving capability information indicating support for requesting the repetition, wherein the configuration information is based at least in part on the capability information.

Aspect 34: The method of any of Aspects 22-33, wherein, based at least in part on the base station not receiving capability information indicating support for requesting the repetition, the configuration information uses a default configuration.

Aspect 35: The method of any of Aspects 22-34, wherein receiving the uplink shared channel based at least in part on the configuration information comprises: receiving one or more repetitions of the uplink shared channel, wherein at least one repetition of the uplink shared channel has been dropped in accordance with the configuration information.

Aspect 36: The method of Aspect 35, wherein the configuration information indicates to drop the at least one repetition based at least in part on at least one of: a cancellation indication, a dynamic slot format indication, or a physical uplink control channel collision.

Aspect 37: The method of Aspect 36, wherein dropping the at least one repetition of the uplink shared channel is based at least in part on a counting configuration, wherein the counting configuration is based at least in part on a set of available slots according to a cell-level time division duplexing configuration.

Aspect 38: The method of Aspect 36, wherein dropping the at least one repetition of the uplink shared channel is based at least in part on a counting configuration, wherein the counting configuration is based at least in part on a counting configuration for a unicast uplink shared channel.

Aspect 39: The method of any of Aspects 22-38, wherein the UE is pre-configured with whether to drop a repetition of the uplink shared channel for a first type of conflict, and wherein the configuration information indicates whether to drop the repetition of the uplink shared channel for a second type of conflict.

Aspect 40: The method of any of Aspects 22-39, further comprising: receiving capability information indicating support for dropping the one or more repetitions, wherein the configuration information is based at least in part on the capability information.

Aspect 41: The method of any of Aspects 22-40, wherein the configuration information is based at least in part on a default configuration based at least in part on the base station not receiving capability information indicating support for dropping the one or more repetitions.

Aspect 42: The method of Aspect 41, wherein the default configuration indicates not to drop the one or more repetitions for at least one of: a cancellation indication, a dynamic slot format indication, or a physical uplink control channel collision.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        transmit capability information indicating support for requesting repetition for an uplink shared channel;
        receive configuration information indicating at least one of:
            a configuration for requesting repetition for the uplink shared channel transmitted after receiving a contention-free random access (CFRA) message, wherein the configuration is based at least in part on the capability information, or
            a configuration for dropping one or more repetitions of the uplink shared channel;
        request the repetition for the uplink shared channel if the configuration information indicates the configuration for requesting repetition; and
        transmit the uplink shared channel based at least in part on the configuration information.

2. The apparatus of claim 1, wherein the one or more processors, to transmit the uplink shared channel based at least in part on the configuration information, are configured to:
    transmit repetitions of the uplink shared channel based at least in part on requesting the repetition for the uplink shared channel.

3. The apparatus of claim 1, wherein the configuration for requesting repetition indicates at least one of:
    a preamble for a message requesting the repetition,
    a random access channel (RACH) occasion for the message requesting the repetition, or
    a physical RACH (PRACH) transmission method for the message requesting the repetition.

4. The apparatus of claim 1, wherein the configuration for requesting repetition indicates that a physical random access channel (PRACH) transmission is to be repeated on two or more random access channel (RACH) occasions.

5. The apparatus of claim 4, wherein the two or more RACH occasions include at least one of:
    two or more time occasions, or
    two or more frequency occasions.

6. The apparatus of claim 4, wherein the two or more RACH occasions are selected from a set of RACH occasions configured for requesting repetition.

7. The apparatus of claim 1, wherein the configuration for requesting repetition indicates a configuration for requesting frequency hopping for repetitions of the uplink shared channel.

8. The apparatus of claim 1, wherein the configuration for requesting repetition for the uplink shared channel is a first configuration that indicates a first preamble, and wherein the configuration information indicates a second configuration associated with a second preamble for transmitting the uplink shared channel without repetition.

9. The apparatus of claim 1, wherein the one or more processors, to transmit the uplink shared channel based at least in part on the configuration information, are configured to:
transmit one or more repetitions of the uplink shared channel, wherein at least one repetition of the uplink shared channel is dropped in accordance with the configuration information.

10. The apparatus of claim 1, wherein the one or more processors are further configured to:
drop at least one repetition of the uplink shared channel in accordance with the configuration information based at least in part on at least one of:
a cancellation indication,
a dynamic slot format indication, or
a physical uplink control channel collision.

11. The apparatus of claim 1, wherein the configuration information does not indicate the configuration for dropping one or more repetitions, and wherein the one or more processors, to transmit the uplink shared channel, are configured to:
ignore a cancellation indication or a dynamic slot format indication prior to completing transmission of the uplink shared channel, wherein a counting configuration associated with the uplink shared channel is based at least in part on a set of available slots according to a cell-level time division duplexing configuration.

12. The apparatus of claim 1, wherein the UE is pre-configured with whether to drop a repetition of the uplink shared channel for a first type of conflict, and wherein the configuration information indicates whether to drop the repetition of the uplink shared channel for a second type of conflict.

13. The apparatus of claim 1, wherein the uplink shared channel is a first uplink shared channel transmitted after receiving the CFRA message.

14. An apparatus for wireless communication at a network entity, comprising:
a memory; and
one or more processors, coupled to the memory, configured to:
receive, from a user equipment (UE), capability information indicating support for requesting repetition for an uplink shared channel;
transmit, to the UE, configuration information indicating at least one of:
a configuration for requesting repetition for the uplink shared channel transmitted after receiving a contention-free random access (CFRA) message, wherein the configuration is based at least in part on the capability information, or
a configuration for dropping one or more repetitions of the uplink shared channel;
receive a request for repetition for the uplink shared channel if the configuration information indicates the configuration for requesting repetition; and
receive the uplink shared channel based at least in part on the configuration information.

15. The apparatus of claim 14, wherein the one or more processors are further configured to:
transmit a random access message indicating a resource allocation to be used by the UE to transmit repetitions of the uplink shared channel.

16. The apparatus of claim 14, wherein the one or more processors, to receive the uplink shared channel based at least in part on the configuration information, are configured to:
receive repetitions of the uplink shared channel based at least in part on requesting the repetition for the uplink shared channel.

17. The apparatus of claim 14, wherein the configuration for requesting repetition indicates at least one of:
a preamble for a message requesting the repetition,
a random access channel (RACH) occasion for the message requesting the repetition, or
a physical RACH (PRACH) transmission method for the message requesting the repetition.

18. The apparatus of claim 14, wherein the configuration for requesting repetition indicates that a physical random access channel (PRACH) transmission is to be repeated on two or more random access channel (RACH) occasions.

19. The apparatus of claim 14, wherein the configuration for requesting repetition indicates a configuration for requesting frequency hopping for repetitions of the uplink shared channel.

20. The apparatus of claim 14, wherein the configuration for requesting repetition for the uplink shared channel is a first configuration that indicates a first preamble, and wherein the configuration information indicates a second configuration associated with a second preamble for transmitting the uplink shared channel without repetition.

21. The apparatus of claim 14, wherein the one or more processors, to receive the uplink shared channel based at least in part on the configuration information, are configured to:
receive one or more repetitions of the uplink shared channel, wherein at least one repetition of the uplink shared channel has been dropped in accordance with the configuration information.

22. A method of wireless communication performed by a user equipment (UE), comprising:
transmit capability information indicating support for requesting repetition for an uplink shared channel;
receiving configuration information indicating at least one of:
a configuration for requesting repetition for the uplink shared channel transmitted after receiving a contention-free random access (CFRA) message, wherein the configuration is based at least in part on the capability information, or
a configuration for dropping one or more repetitions of the uplink shared channel;
requesting the repetition for the uplink shared channel if the configuration information indicates the configuration for requesting repetition; and
transmitting the uplink shared channel based at least in part on the configuration information.

23. The method of claim 22, wherein transmitting the uplink shared channel based at least in part on the configuration information further comprises:
transmitting repetitions of the uplink shared channel based at least in part on requesting the repetition for the uplink shared channel.

24. The method of claim 22, wherein the configuration for requesting repetition indicates at least one of:
a preamble for a message requesting the repetition,
a random access channel (RACH) occasion for the message requesting the repetition, or
a physical RACH (PRACH) transmission method for the message requesting the repetition.

25. The method of claim 22, wherein the configuration for requesting repetition indicates that a physical random access channel (PRACH) transmission is to be repeated on two or more random access channel (RACH) occasions.

26. A method of wireless communication performed by a network entity, comprising:

receiving, from a user equipment (UE), capability information indicating support for requesting repetition for an uplink shared channel;

transmitting, to the UE, configuration information indicating at least one of:

a configuration for requesting repetition for the uplink shared channel transmitted after receiving a contention-free random access (CFRA) message, wherein the configuration is based at least in part on the capability information, or a configuration for dropping one or more repetitions of the uplink shared channel;

receiving a request for repetition for the uplink shared channel if the configuration information indicates the configuration for requesting repetition; and receiving the uplink shared channel based at least in part on the configuration information.

27. The method of claim 26, further comprising:

transmitting a random access message indicating a resource allocation to be used by the UE to transmit repetitions of the uplink shared channel.

28. The method of claim 26, wherein receiving the uplink shared channel based at least in part on the configuration information further comprises:

receiving repetitions of the uplink shared channel based at least in part on requesting the repetition for the uplink shared channel.

29. The method of claim 26, wherein the configuration for requesting repetition indicates at least one of:

a preamble for a message requesting the repetition, a random access channel (RACH) occasion for the message requesting the repetition, or a physical RACH (PRACH) transmission method for the message requesting the repetition.

30. The method of claim 22, wherein the configuration for requesting repetition indicates a configuration for requesting frequency hopping for repetitions of the uplink shared channel.

\* \* \* \* \*